(No Model.) 2 Sheets—Sheet 1.
T. J. NEACY.
GANG EDGER.
No. 306,944. Patented Oct. 21, 1884.
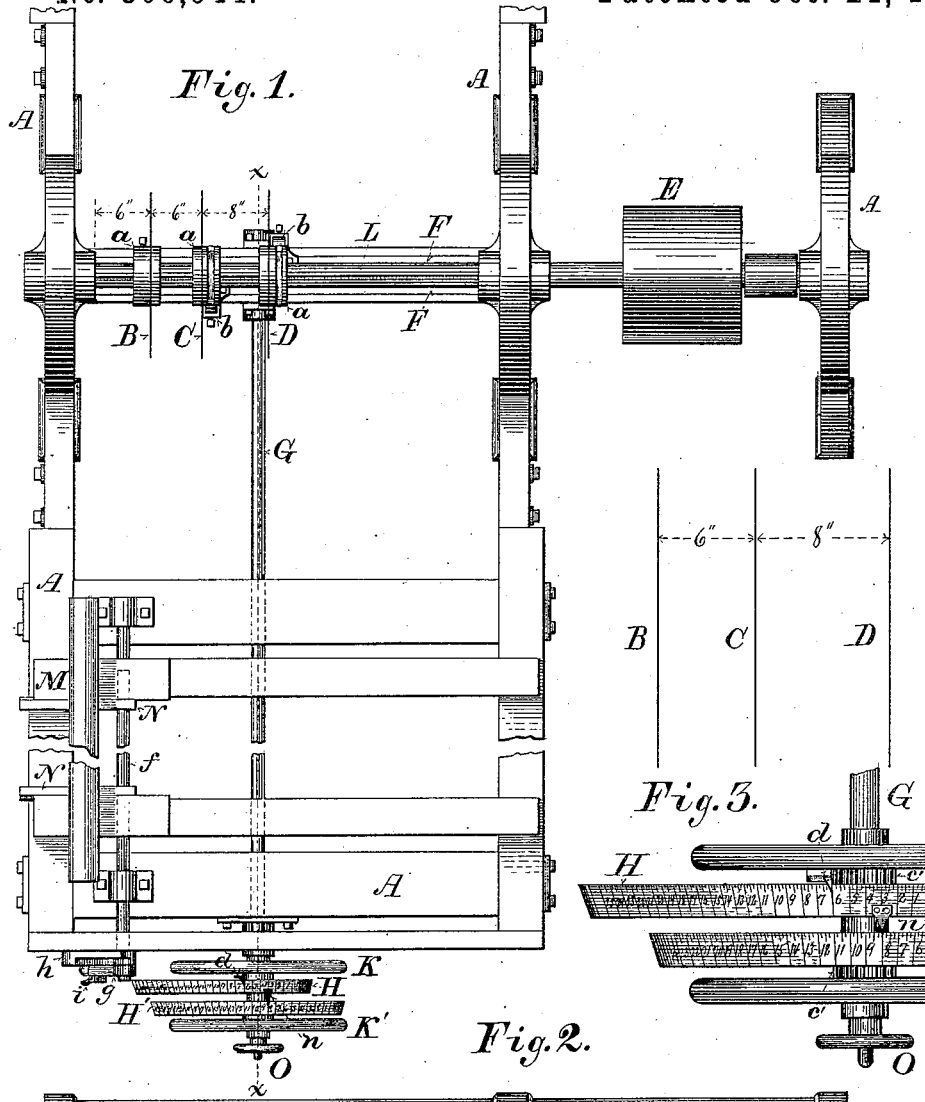
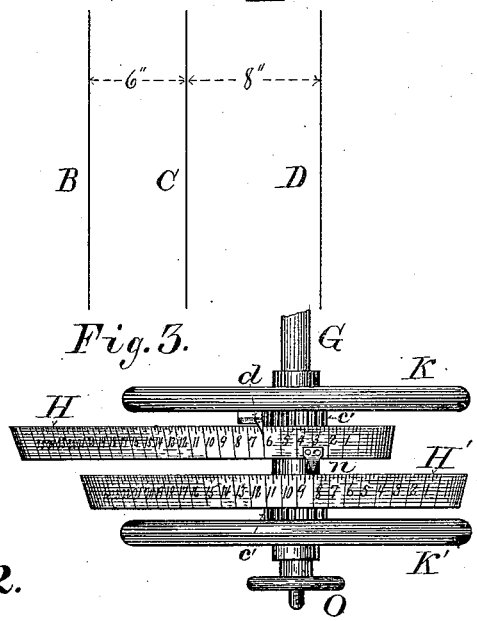
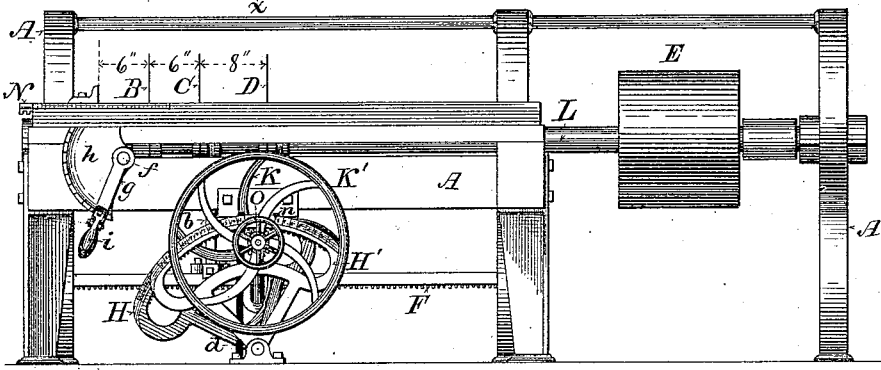
Witnesses:
Frank Regensdorf
Frederic H. Peterson
Inventor,
Thomas J. Neacy,
per _____
Attorney.

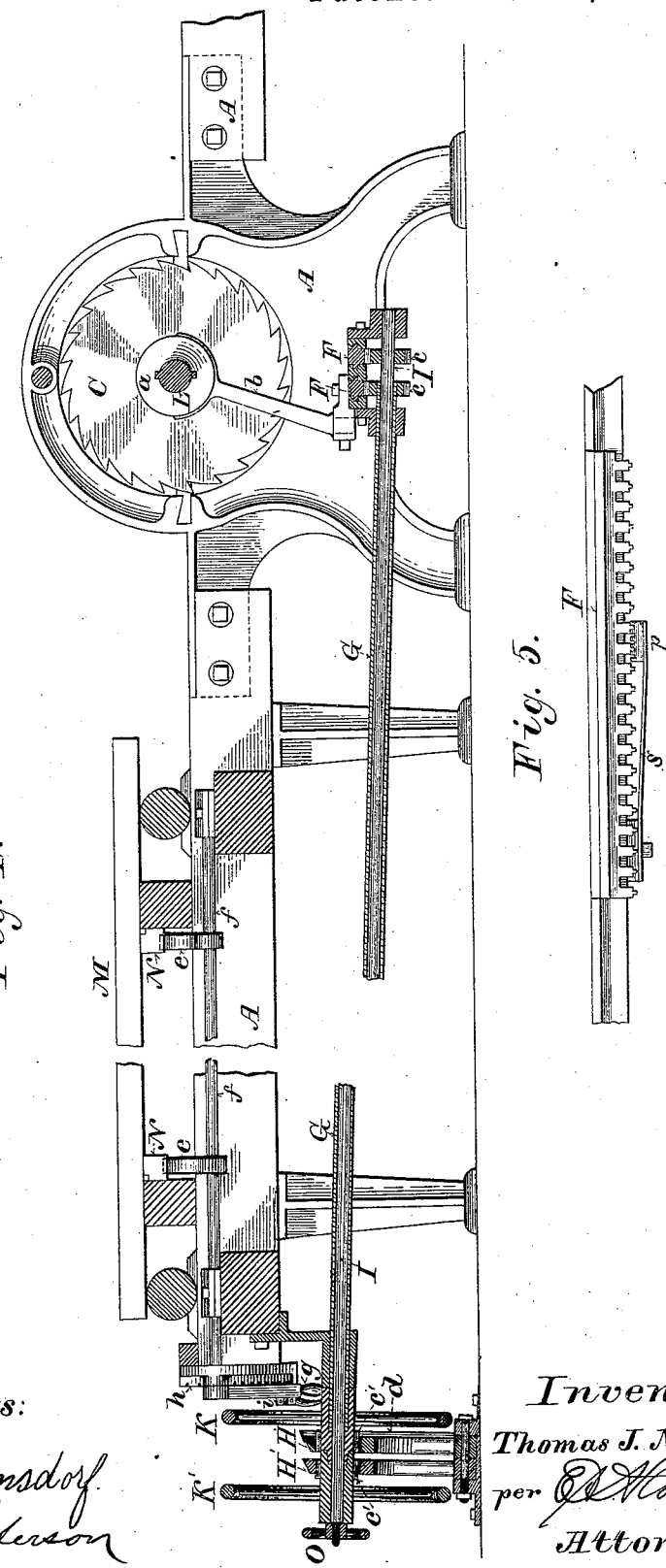

UNITED STATES PATENT OFFICE.

THOMAS J. NEACY, OF MILWAUKEE, WISCONSIN.

GANG-EDGER.

SPECIFICATION forming part of Letters Patent No. 306,944, dated October 21, 1884.

Application filed July 11, 1883. (No model.)

*To all whom it may concern:*

Be it known that I, THOMAS J. NEACY, of Milwaukee, in the county of Milwaukee and State of Wisconsin, have invented certain new and useful Improvements in Self-Calculating Registers for Gang-Edgers; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to gang-edgers; and it consists, essentially, of a register composed of indexes which indicate directly upon traveling graduated scales the relative positions of the saws, the objects of which are, first, to avoid the errors incident to the mental calculations necessary with the scales or registers heretofore employed; and, second, a device by means of which the saws may be quickly and accurately set at any desired intervals upon the arbor.

In the accompanying drawings like letters refer to the same parts in the several figures.

Figure 1 is a plan view of a gang-edger having one fixed and two movable saws with my improved self-calculating register applied thereto. Fig. 2 is an end elevation of the same, showing the front of the registering device. Fig. 3 is a detached plan view, on an enlarged scale, of the registering device and saws. Fig. 4 is a longitudinal vertical section of the edger and register on the line $x$ $x$, Fig. 1; and Fig. 5 is a detached view, on an enlarged scale, of the device used to hold the movable saws in position when set.

A A is the frame of the edger, which has a fixed saw, B, and movable saws C and D.

L is the saw-arbor, provided with counterbalancing-feathers, which fit into grooves in the eyes of the sleeves $a$ $a$ $a$, and prevent the saws from turning upon said arbor, and at the same time allow of their lateral adjustment.

E is the driving-pulley. The saw B is provided with a set-bolt passing through its collar $a$ against the arbor L. Each of the movable saws C and D is connected by the shifting-arms $b$ $b$ with the racks F F, which slide in ways parallel to and directly beneath the arbor L.

$p$ are small racks supported upon springs $s$, by which they are caused to engage with the small supplemental teeth on racks F F, and arrest and detain the saws C and D at any desired point of their travel.

G is a tubular shaft, provided at each end with the duplicate pinions $c$ $c'$.

I is a shaft passing through and extending beyond the tubular shaft G, and provided at its ends with a pair of duplicate pinions, $c$ $c'$, like those upon the shaft G. The pinions $c$ $c$ mesh with the rack F F. The shafts G and I are provided at their front ends with large hand-wheels K K', by means of which the saws C and D may be moved laterally in either direction.

In the gang-edgers heretofore used, the saws are set by guess by means of notches cut at intervals in the rims of the hand-wheels by which they are operated, or by pointers traveling with each saw and indicating its movements upon a single common scale just above the saws and at a distance from the operator, in the use of all of which method and devices errors and inaccuracies are always liable to occur. To meet these difficulties, I provide the graduated segmental scale-racks H H', which are pivoted close together at any convenient point directly beneath the shafts G and I, so as to mesh with the small pinions $c'$ $c'$ on the ends of said shafts. The scale H is provided with an index, $d$, fixed to bed-plate of the same, and brought to a point close to its graduated face, so as to register directly and precisely the movement of the saw C with reference to the saw B. A second index, $n$, is attached to the scale H near the beginning of its graduated face, and brought to a point close to the graduated face of the scale H', so as to register directly the exact movement of each of the saws C and D with reference to each other. The pinions $c'$ $c'$ have conical frictional faces, which may be clamped together by the handscrew O on the end of the shaft I. By means of this device the saws C and D can first be set at any desired distance apart, (indicated by the index $n$ upon the scale H',) and then both moved together to any desired position upon the arbor L, as indicated by the index $d$ upon the scale H.

In the machine shown in the drawings, with the fixed saw B at the left side, the scales H H' are graduated from right to left, so as to register directly the distance of the saws C and D from the fixed saw B and their distance from each other. When set with their collars $a\,a\,a$ in contact, they will be two inches apart.

M is a longitudinal gage adapted to be moved laterally upon the frame A, with its perpendicular face in a plane always parallel to that of the saws, by means of the racks N N and pinions $e\,e$, fixed upon the shaft $f$, which has bearings in the frame A, and is provided at its front end with the right-angled arm $g$. The arm $g$ swings close to the face of the segmental rack $h$, and is provided with a spring-catch, $i$, to engage with the notches therein and hold the gage M in place. The intervals between the notches in the rack $h$ represent one inch or other convenient interval of the lateral movement of the gage N, and when the spring-catch $i$ rests in the first notch the face of the gage will be flush with the inner side of the saw-frame. The number and arrangement of the saws may be varied according to the amount and kind of work to be done, and in place of the segmental scales H H', I may use straight scales, although the former are preferable, since they can be operated in a smaller space and with simpler bearings.

My improved device operates as follows: The first saw, B, is set at any desired distance from the frame—for instance, six inches therefrom—by means of the set-bolt passing through its collar $a$. The second saw, C, is set at any desired distance from the saw B—for instance, six inches therefrom—by turning the hand-wheel K till the index $d$ points to the figure "6" on the scale H; and the third saw, D, is set at the desired distance from the saw C—for instance, eight inches therefrom—by turning the hand-wheel K' till the index $n$ points to the figure "8" upon its scale H'; or the saws C and D may be first set at any desired distance from each other indicated by the index $n$ upon the scale H', the pinions $c'\,c'$ then clamped together, and the two saws moved at once to any desired position upon the arbor L, indicated by the index $d$ upon the scale H. The first saw, B, may be gaged to saw any less width on the outside than that included between it and the frame—for instance, three inches—by turning the arm $g$ until the catch $i$ engages with the third notch in the rack $h$, when the front face of the gage M will be in a plane three inches from said saw. By this arrangement the operator is enabled to set the saw quickly and accurately without mental calculation, as the position of each saw with reference to that next to it is registered directly upon its proper scale, which is at all times before him in plain view.

I do not wish to confine myself to the exact means herein described of adjusting the saws and operating the self-calculating scales. The saws may be moved laterally by a system of levers, to which my improved registering device may be effectually applied, as well as to any convenient and practicable device for setting the saws.

Having thus described my invention, what I claim as new, and desire to secure by Letters Patent, is—

1. In a gang-edger, a register composed of the graduated scales H H', a fixed index, $d$, indicating thereon the movement of the scale H, and an index, $n$, attached to the rack H, and indicating upon the other rack, H', the movements of said racks relative to each other, substantially as and for the purposes set forth.

2. In a gang-edger the combination, with a laterally-adjustable saw, of a shaft provided with pinions $c\,c'$, and a crank or hand-wheel, K', a rack, F, meshing with pinion $c$, and connected with said saw, a graduated scale-rack, H, meshing with said pinion $c'$, and an index, $d$, indicating the movement of said saw upon the graduated face of said scale-rack, substantially as and for the purposes set forth.

3. In a gang-edger a register composed of the graduated segmental rack H H', operated by pinions $c'\,c'$, indexes $d$ and $n$, and pinions $c'\,c'$, substantially as and for the purposes set forth.

4. The combination, in a gang-edger, of laterally adjustable saws C and D, shafts G and I, provided with pinions $c\,c$ and $c'\,c'$, racks F F, meshing with pinions $c\,c$, and connected with said saws, graduated scale racks H H', meshing with pinions $c'\,c'$, fixed index $d$, and index $n$, attached to one scale and indicating the movement of each upon the other, substantially as and for the purposes set forth.

5. In a gang-edger a register composed of the graduated scale-racks H H', operated by pinions $c'\,c'$, indexes $d$ and $n$, pinions $c'\,c'$, and the screw O, by which said pinions are clamped and said scale-racks caused to move together, substantially as and for the purposes set forth.

In testimony that I claim the foregoing as my own I affix my signature in presence of two witnesses.

THOMAS J. NEACY.

Witnesses:
  CHAS. L. GOSS,
  WM. N. BENTLEY.